United States Patent [19]

Krystaszek

[11] Patent Number: 4,729,934

[45] Date of Patent: Mar. 8, 1988

[54] BATTERY SIDE TERMINAL

[76] Inventor: Henry J. Krystaszek, 893 Cypress Lake Cir., Fort Myers, Fla. 33907

[21] Appl. No.: 934,679

[22] Filed: Nov. 25, 1986

[51] Int. Cl.⁴ .............................................. H01M 2/30
[52] U.S. Cl. ...................................... 429/179; 429/181
[58] Field of Search ................ 429/179, 178, 182, 181

[56] References Cited

U.S. PATENT DOCUMENTS

| | | | |
|---|---|---|---|
| 2,505,207 | 4/1950 | Riggs | 429/179 X |
| 4,154,907 | 5/1979 | Crow | 429/179 |
| 4,351,890 | 9/1982 | Oxenreider | 429/179 |
| 4,446,214 | 5/1984 | Mocas | 429/179 |

FOREIGN PATENT DOCUMENTS 1431770 4/1976 United Kingdom ................ 429/179

Primary Examiner—Anthony Skapars
Attorney, Agent, or Firm—Glenn A. Buse

[57] ABSTRACT

A side terminal battery includes a terminal having a plug formed of relatively deformable lead disposed within an aperture formed in the battery casing, and a one-piece battery terminal insert embedded within the lead so as to be accessible from the exterior of the battery. An interior, closed-ended cavity, opening through the exposed end of the insert, is formed within the insert and includes interior threads for engaging a threaded battery connector fastener. The interior threads terminate before reaching the closed end of the cavity such that a true indication of battery connector fastener tightness is provided. The closed end wall of the insert forms a barrier between the end of the fastener and the interior of the battery casing, and a plurality of serrations on the outer surface of the insert permit the insert to rotate within the lead plug when a torque in excess of a predetermined maximum is applied to the insert. Thus, multi-level protection against battery damage is provided in the event a fastener of excessive length is utilized, or in the event the fastener is over-tightened within the battery terminal.

12 Claims, 5 Drawing Figures

U.S. Patent
Mar. 8, 1988
4,729,934
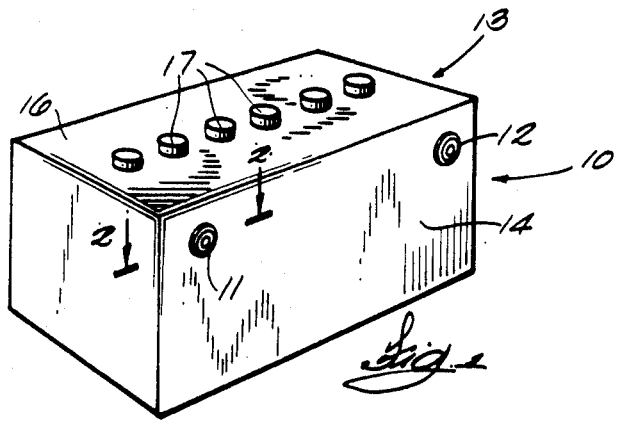
Fig. 1
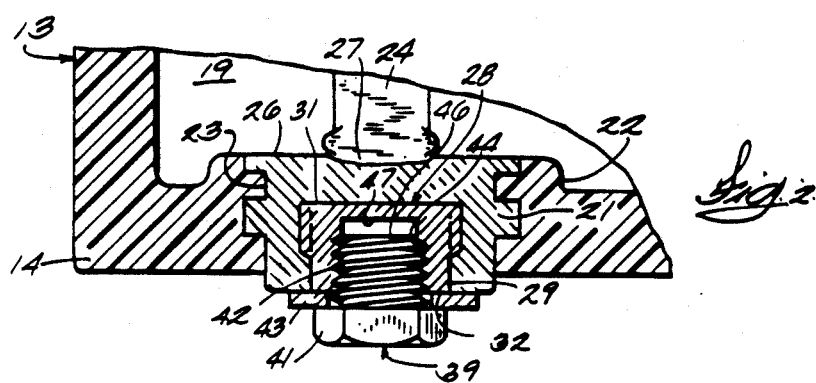
Fig. 2
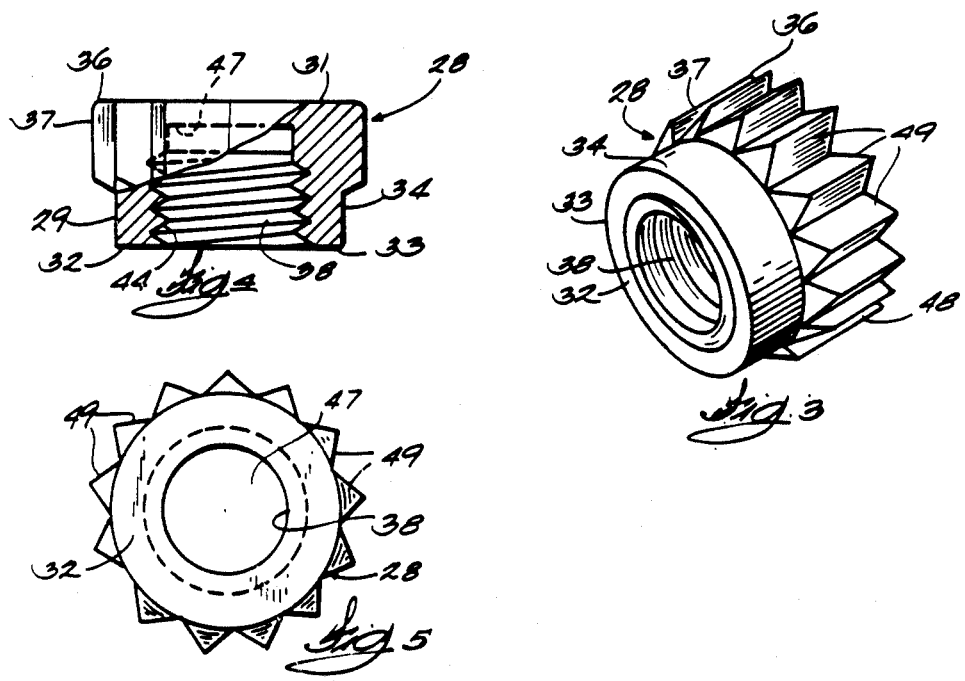
Fig. 3
Fig. 4
Fig. 5

BATTERY SIDE TERMINAL

BACKGROUND OF THE INVENTION

This invention relates generally to battery terminals and more particularly to a battery side terminal having an insert for providing protection against battery damage resulting from over-tightening or improper use of a threaded battery connector fastener.

Batteries having molded-in-place lead terminal structures are known in the battery art and typically rely on the integrity of the lead casting to effectively seal the battery against leakage of fluid electrolyte through the terminal. Because lead is relatively soft, and hence rather easily deformed, it is a known practice to cast the lead around a two-piece structure having a threaded, open-ended, corrosion resistant nut in combination with a separate end cap disk in order to provide the terminal with a durable socket for receiving the threaded shank of a battery connector fastener.

Although the use of a threaded, open-ended nut in conjunction with a separate end cap is effective in providing a secure connection when a battery connector fastener of the proper length is used, the consistent use of properly dimensioned fasteners throughout the life of the battery cannot always be assured. When a fastener having excessive length is inserted into a terminal and fully tightened, it is possible for the excess length of the fastener to force the end cap into the relatively soft lead lying behind the nut. The resulting deformation of the underlying lead can physically break the internal connections of the battery. In extreme cases, the end cap can be forced fully through the lead and into the interior of the battery, thereby creating the risk of short circuits and a possible battery explosion.

In view of the foregoing, it is a general object of the present invention to provide a new and improved battery terminal construction.

It is another object of the present invention to provide a new and improved battery terminal construction which protects against battery damage in the event a battery connector fastener having excessive length is inserted into the terminal.

It is still another object of the present invention to provide a new and improved battery terminal construction which protects against battery damage in the event a battery connector fastener is over-tightened during installation.

SUMMARY OF THE INVENTION

The invention is directed to an insert for a battery terminal comprising a one-piece corrosion resistant member having a serrated outer surface and defining an interior cavity having an open end for receiving a battery connector fastener and a closed end for isolating the cavity from the interior of the battery.

The invention is also directed to a side terminal battery comprising a casing having a side wall and a plug formed of relatively deformable, electrically conductive, corrosion resistant material extending through the side wall between the interior and exterior of the casing. A battery terminal insert is embedded within the plug so as to be exposed at the exterior of the casing and isolated, by the plug, from the interior of the casing. The insert comprises a one-piece corrosion resistant member formed of electrically conductive, relatively non-deformable material and defines an interior cavity having an open end for receiving a threaded battery connector fastener and a closed end for isolating the interior cavity from the plug. The corrosion resistant member further includes a serrated outer surface for securing the insert within the relatively deformable material so as to resist rotation of the insert relative to the plug in response to an applied torque of less than a predetermined maximum and to permit rotation of the insert relative to the plug in response to an applied torque in excess of the predetermined maximum so as to maintain the integrity of the casing despite over-tightening of the threaded battery connector fastener within the cavity.

The invention is also directed to a battery terminal insert for a side terminal battery comprising a one-piece substantially cylindrical member having a first end, a portion of relatively lesser diameter adjacent the first end, a second end, and a portion of relatively greater diameter adjacent the second end. A plurality of axially extending, circumferentially spaced, serrations are formed in the exterior of the portion of relatively greater diameter, and an interior cavity of substantially circular cross-section, opening through the first end and extending toward, but not through, the second end, is formed in the cylindrical member such that the interior cavity is open at the first end of the cylindrical member and closed at the second end. A plurality of threads are formed within the cavity.

In one embodiment of the invention, the threaded interior of the interior cavity runs from the open end of the interior cavity toward the closed end and terminates prior to reaching the closed end such that a true indication of battery connector fastener tightness due to thread-to-thread contact alone is provided.

In one embodiment of the invention, the closed end of the interior cavity is integrally formed with the remainder of the corrosion resistant member so as to provide a barrier between a threaded battery connector and the interior of the battery casing.

BRIEF DESCRIPTION OF THE DRAWINGS

The features of the present invention which are believed to be novel are set forth with particularity in the appended claims. The invention, together with the further advantages thereof, can best be understood with reference to the following description taken in conjunction with the accompanying drawings, in the several figures of which like reference numerals identify like elements, and in which:

FIG. 1 is a perspective view of a side terminal battery having a pair of side terminals constructed in accordance with the invention.

FIG. 2 is a fragmentary cross-sectional view of one of the battery terminals illustrated in FIG. 1 taken along line 2—2 thereof.

FIG. 3 is a perspective view of a battery terminal insert constructed in accordance with one aspect of the invention.

FIG. 4 is a side elevational view, partially in section, of the battery terminal insert illustrated in FIG. 3.

FIG. 5 is a front elevational view of the battery terminal insert illustrated in FIG. 3.

DESCRIPTION OF THE PREFERRED EMBODIMENT

A side terminal battery 10, having a pair of side terminals 11 and 12 constructed in accordance with the invention, is illustrated in FIGS. 1 and 2. As shown, battery 10 includes a generally rectangular casing or housing 13 having a side wall 14 and a cover 16 preferably molded from a synthetic thermoplastic material such as a propylene/ethylene copolymer. A plurality of openings, each having an associated removable cap 17, are formed through cover 16 for allowing the introduction of fluid electrolyte into each of the individual cells of the battery.

The construction of one of the battery side terminals, terminal 11, is illustrated in detail in FIG. 2. The construction of side terminal 12 can be identical to that of terminal 11. As illustrated, the side wall 14 of the battery casing 13 separates the exterior of the housing from the interior 19 thereof, and a plug 21, formed of a relatively deformable, electrically conductive, corrosion resistant material, is disposed within the side wall 14 so as to extend through the sidewall between the interior and exterior of the housing. Preferably, the relatively deformable material comprises lead and is molded in place when the casing 13 is formed by injection molding or the like, so as to form a seal and thereby prevent the leakage of battery electrolyte through the terminal.

To increase the strength of the side terminal 11 and to improve the quality of the seal between the lead plug 21 and the side wall 14 of the battery casing 13, a raised cylindrical boss 22 can optionally be integrally formed on the interior of the side wall 14 around plug 21, and one or more circumferentially extending grooves 23 can be formed in the side of the plug 21 as illustrated. To provide an electrical connection to the various battery plates (not shown) within casing 13, a lead strap 24 is mechanically and electrically joined to the interior rear surface 26 of the lead plug 21 by appropriate means such as a weld 27.

In order to provide protection against battery damage resulting from over-tightening or use of an improperly dimensioned threaded battery connector fastener, side terminal 11, in accordance with one aspect of the invention, includes embedded within the relatively deformable lead plug 21, a one-piece battery terminal insert 28. In order to withstand exposure to the sulfuric acid commonly used as the battery electrolyte fluid, the battery terminal insert 28 is preferably formed of a corrosion resistant, electrically conductive, relatively non-deformable material such as stainless steel. Preferably, the battery terminal insert 28 is embedded within the lead plug 21 so as to be exposed at the exterior of the casing 13 and isolated, by the plug, from the interior of the housing. To this end, the lead plug 21 fully surrounds the side 29 and rear 31 surfaces of the insert 28 so as to fully isolate the insert from the battery electrolyte, while the front surface 32 of the insert is exposed to permit access from the exterior of the battery.

The construction of the battery terminal insert 28 is best illustrated in FIGS. 3, 4 and 5. As shown, insert 28 comprises a one-piece, substantially cylindrical member having a first end 33, a portion of relatively lesser diameter 34 adjacent the first end 33, a second end 36 and a portion of relatively greater diameter 37 adjacent the second end 36. As further illustrated, insert 28 includes an interior cavity 38 of substantially circular cross-section opening through the first end 33 and extending toward, but not through, the second end 36 such that the interior cavity 38 is open at the first end 33 of the insert 28 and closed at the second end 36. Thus, insert 28 defines an interior cavity 38 having an open end for receiving a battery connector fastener 39 (FIG. 2) and an integrally formed closed end for isolating the cavity and the fastener from the interior 19 of the battery.

As illustrated in FIG. 2, the battery connector fastener 39 includes a hexagonal head portion 41 and a threaded shank portion 42 dimensioned to pass through a circular aperture formed in a battery connector 43. The battery connector fastener 39 functions to mechanically and electrically secure the battery connector 43 to the terminal 11 such that electrical current can pass from the battery 10, through the battery connector 43, and into an electrical conductor (not shown).

The interior cavity 38 of the battery terminal insert 28 is internally threaded so as to engage complementary threads formed on the shank 42 of the battery connector fastener 39. The interior threads 44 formed within the interior cavity 38 begin adjacent the open end of the cavity and run toward the closed end. Preferably, the interior threads 44 terminate some distance from the closed end of the cavity as best illustrated in FIGS. 2 and 4. By not extending the interior threads 44 to the full depth of the interior cavity 38, a true indication of battery connector fastener tightness due to thread-to-thread contact alone is provided. Accordingly, the battery connector fastener 39 can be fully tightened within the battery terminal insert 28 without bringing the end 46 of the fastener into contact with the closed end wall 47 of the interior cavity 38.

To secure the battery terminal insert 28 within the lead plug 21 or some such other relatively deformable medium, a knurled or serrated outer surface 48 is preferably formed on at least a portion of the outer surface of the battery terminal insert 28. As best illustrated in FIGS. 3 and 5, the knurled outer surface 48 includes a plurality of serrations 49 circumferentially spaced around the exterior of the insert 28 and extending axially parallel to the longitudinal axis thereof. Preferably, the serrations 49 are formed in the outer periphery of the relatively greater diameter portion 37 and preferably have a substantially V-shaped cross-section. It will be appreciated, however, that other serration shapes can be used. Although the serrations 49 can be formed through any one of a variety of techniques, it has been found that the corrosion resistance of the insert 28 can be improved when the serrations are formed by means of a four-stage progressive swedging or swaging process. The use of this technique is thought to close the pores of the insert material and thereby protect against battery acid becoming trapped between the insert and the lead plug.

Preferably, the serrations are dimensioned such that rotation of the battery terminal insert 28 within the relatively deformable lead plug 21 is resisted when the torque applied to the insert is less than a predetermined maximum. However, when the applied torque exceeds the predetermined maximum, such as might occur when the battery connector fastener 39 is subjected to extreme over-tightening, the dimension of the serrations is preferably such that the interface between the serrations and the lead plug 21 will fail so as to allow the insert to rotate within the plug. This prevents further travel of the battery connector fastener into the terminal 11 and maintains the integrity of the seal formed by the lead plug 21 within the housing side wall 14. A spacing of twelve serrations per inch of insert circumference has been found to provide acceptable performance. It will be appreciated, however, that other serration spacings can be used.

The use of knurls or serrations 49 on the exterior of the insert 28 provides significant advantages over other configurations including one or more flat surfaces interfacing with the lead plug 21. In particular, knurling the exterior of the insert requires less material than configurations having flat surface(s). Significant material cost savings can thus be realized. Furthermore, a flat surface (e.g. hexagonal) exterior requires an excessive torque before slippage between the insert and the lead plug occurs. Thus, such configurations do not provide as reliable protection against extreme over-tightening as is provided by a serrated exterior.

It will be appreciated that the battery terminal construction, and in particular the battery terminal insert 28, described herein provides multiple levels of protection against damage in the event a battery terminal fastener of excessive length is utilized or in the event excessive torque is applied to the fastener during tightening. First, failure of the interior threads 44 to extend fully to the closed end of the interior cavity 38 provides a true indication of connector fastener tightness due to thread-to-thread contact alone, long before the connector fastener can cause damage to the battery terminal 11. In the event tightening continues despite such an indication of adequate tightness, the integrally formed closed end wall 47 of the interior cavity functions as a physical barrier to resist further travel of the connector fastener into the insert so as to greatly increase the rotational resistance of the fastener and thereby provide still another indication that the connector is adequately tightened. In the event additional torque is applied in an effort to tighten the fastener still further, the juncture between the insert and the lead plug will fail and thereby allow the insert to rotate freely within the lead plug. When this occurs, continued rotation of the battery connector fastener will fail to advance the connector any farther into the battery terminal 11 and hence the integrity of the seal provided by the lead plug within the casing side wall will be maintained. An additional feature of the invention is that the battery terminal insert 28 can be easily and economically manufactured from round bar stock using relatively simple machining operations.

It will be appreciated that various modifications can be made to the particular terminal construction shown and described. For example, although the use of stainless steel in the construction of the insert 28 is preferred, other corrision resistant materials can be successfully employed. Additionally, the dimension, shape, number and position of the exterior serrations 49 can be adjusted as required to provide release of the insert within the lead plug when a particular, predetermined, maximum applied torque on the insert is reached.

While a particular embodiment of the invention has been shown and described, it will be obvious to those skilled in the art that changes and modifications may be made without departing from the invention and its broader aspects, and, therefore, the aim in the appended claims is to cover all such changes and modifications as fall within the true spirit and scope of the invention.

I claim:

1. A side terminal battery comprising:
   a casing having a side wall made from a moldable material; and
   a plug formed of relatively deformable, electrically conductive, corrosion resistant material molded into said side wall to form a seal between the interior and exterior of said casing and including a battery terminal insert embedded therein so as to be exposed at the exterior of said casing and isolated, by said plug, from the interior of said casing, said battery terminal insert comprising:
   an elongate one-piece corrosion resistant member formed of electrically conductive, relatively non-deformable material and including an exterior having a generally circular cross section and an interior cavity having an open end for receiving a threaded battery connector fastener and a closed end for isolating said interior cavity from said plug, and further including a plurality of circumferentially spaced, axially extending serrations in said exterior for securing said insert within said relatively deformable material to resist rotation of said insert relative to said plug when less than a predetermined maximum torque is applied on said insert and to permit rotation of said insert relative to said plug when said predetermined maximum torque is exceeded so as to maintain the seal between said plug and said side wall despite overtightening of the threaded battery connector fastener within said cavity.

2. A side terminal battery as defined in claim 1 wherein said interior cavity includes interior threads for receiving the threaded battery connector fastener, said interior threads running from said open end of said interior cavity toward said closed end and terminating prior to reaching said closed end such that a true indication of battery connector fastener tightness due to thread-to-thread contact alone is provided.

3. A side terminal battery as defined in claim 2 wherein said closed end is integrally formed with the remainder of said corrosion resistant member and provides a barrier between the threaded battery connector fastener and the interior of said casing.

4. A side terminal battery as defined in claim 1 wherein said serrations extend generally parallel to the longitudinal axis of said corrosion resistant member.

5. A side terminal battery as defined in claim 4 wherein said serrations are of substantially V-shaped cross-section and are formed by swaging.

6. A side terminal battery as defined in claim 1 wherein said relatively deformable material is lead and said relatively non-deformable material is stainless steel.

7. A battery terminal insert for a side terminal battery comprising:
   a substantially cylindrical member having a first end, a portion of relatively lesser diameter adjacent said first end, a second end, and a portion of relatively greater diameter adjacent said second end and having an exterior;
   a plurality of circumferentially spaced, axially extending serrations formed in said exterior of said portion of relatively greater diameter,
   said cylindrical member including an interior cavity of substantially circular cross-section opening through said first end and extending toward but not through said second end and such that said interior cavity is open at said first end of said cylindrical member and closed at said second end, and
   a thread formed within said cavity.

8. A battery terminal insert as defined in claim 7 wherein said thread within said interior cavity is spaced from said closed end of said interior cavity.

9. A battery terminal insert as defined in claim 7 wherein said battery terminal insert is adapted to be embedded in a relatively deformable surrounding medium and said serrations are dimensioned to secure said insert within said relatively deformable medium and resist rotation of said insert relative to said medium when less than a predetermined maximum torque is applied on said insert and to permit rotation of said insert relative to said medium when a torque in excess of said predetermined maximum is applied on said insert.

10. A battery terminal insert as defined in claim 9 wherein said serrations are of substantially V-shaped cross-section.

11. A battery terminal insert as defined in claim 9 wherein said serrations are formed by progressive swaging.

12. A battery terminal insert as defined in claim 11 wherein said cylindrical member is formed of stainless steel and said relatively deformable medium is lead.

* * * * *

UNITED STATES PATENT AND TRADEMARK OFFICE
CERTIFICATE OF CORRECTION

PATENT NO. : 4,729,934

DATED : March 8, 1988

INVENTOR(S) : Henry J. Krystaszek

It is certified that error appears in the above-identified patent and that said Letters Patent is hereby corrected as shown below:

Column 8, line 3, the referenced claim "9" should read ---10---.

Signed and Sealed this

Ninth Day of August, 1988

Attest:

DONALD J. QUIGG

*Attesting Officer*     *Commissioner of Patents and Trademarks*